(12) United States Patent
Lutz

(10) Patent No.: US 6,521,965 B1
(45) Date of Patent: Feb. 18, 2003

(54) INTEGRATED PRESSURE SENSOR

(75) Inventor: Markus Lutz, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/660,218

(22) Filed: Sep. 12, 2000

(51) Int. Cl.[7] .............................................. H01L 29/82
(52) U.S. Cl. .......................... 257/415; 438/24; 438/48; 438/53; 438/745; 73/754
(58) Field of Search .............................. 438/24, 48, 53, 438/745; 73/754

(56) References Cited

U.S. PATENT DOCUMENTS

| | | | | |
|---|---|---|---|---|
| 5,798,283 A | * | 8/1998 | Montague et al. ............ | 438/24 |
| 5,963,788 A | * | 10/1999 | Barron et al. ................. | 438/48 |
| 6,012,336 A | * | 1/2000 | Eaton et al. ................... | 73/754 |
| 6,159,762 A | * | 12/2000 | Scheiter et al. ............... | 438/53 |
| 6,174,820 B1 | * | 1/2001 | Habermehl et al. .......... | 438/745 |

* cited by examiner

*Primary Examiner*—David Nelms
*Assistant Examiner*—Mai-Huong Tran
(74) *Attorney, Agent, or Firm*—Kenyon & Kenyon

(57) ABSTRACT

An integrated pressure sensor system and method for making such a device are provided. The pressure system includes a capacitor having an underlying electrode, a dielectric cavity, an upper electrode, and an etch cavity for removing sacrificial material from the dielectric cavity. The surface of the device is relatively flat due to epitaxal deposition of epi polysilicon and single crystal silicon. The capacitor circuit of the pressure sensor system is capable of undergoing CMOS processes without requiring additional steps of covering the capacitor device to protect it and then removing the covering following the CMOS processes.

16 Claims, 3 Drawing Sheets

INTEGRATED PRESSURE SENSOR

BACKGROUND INFORMATION

The present invention relates to an integrated pressure sensor and a method for manufacturing an integrated pressure sensor. More specifically, an integrated pressure sensor fabricated using micro-electro-mechanical systems ("MEMs") process is provided in a structure, which may also include devices created by a complementary metal oxide semiconductor ("CMOS") process.

Surface and bulk micro-machined pressure sensors are known in the art (see, e.g., the SMD082 pressure sensor manufactured by the Robert Bosch Corporation, which is a bulk micro-machined pressure sensor system). Using similar technologies to those used to manufacture semiconductors, microscopic capacitors may be fabricated on silicon wafers. In certain applications, a capacitor may then be used for measuring pressure. For example, pressure applied to one electrode of the capacitor will cause it to deflect towards the other electrode of the capacitor resulting in a change in capacitance. The technologies for manufacturing capacitors on silicon wafers may include oxidation of a substrate, application of a photoresist material, selective exposure to light or x-rays through a mask, and etching to build devices in layers on a substrate.

Although similar techniques are used for creating integrated circuits ("ICs") and micro-electro-mechanical devices ("MEMs"), when both ICs and MEMs are constructed on the same substrate, elements of these processes can interfere with each other. For example, polishing and etching processes used in the manufacture of ICs may damage MEMs that have already been created on a silicon wafer. In addition, subjecting certain MEMs to high temperatures used for processing and building MEMs can damage or destroy the CMOS circuits. Cutting or "dicing" of a silicon wafer can also damage MEMs as stray particles can destroy a MEMs structure.

One solution for protecting a MEM during circuit creation and wafer processing has been to cover the MEM device with a protective layer (e.g., a layer of silicon oxide) during the processing stages in which the circuitry is created and the wafer is diced. This protective layer must later be removed in a time-consuming process. Furthermore, it is difficult to remove the protective layer without damaging the electronics components, and therefore the types of electronics that can be developed are limited.

In other known pressure sensor systems, the pressure sensor and the supporting circuitry are separately made in a so-called back-end integration process. In one known process, two piezoelectric resistors are formed in the substrate—one towards the bottom of the substrate, one towards the top of the substrate. A relatively thick silicon dioxide exists below the second piezoelectric element. During the "back-end" processing a Potassium Hydroxide (KOH) etch is performed to create an open volume over the second piezoelectric resistor. If this open volume is evacuated, then the resistance of the second piezoelectric resistor will be related to the pressure in a vacuum. The pressure applied to the top of the substrate affects the resistance of the first piezoelectric resistor. The difference between the resistances of the first and second piezoelectric resistors may be used to provide a measurement of pressure.

Whether MEMs are developed first on a wafer and ICs are later developed, or the other way around, adding and later removing a protective covering for the first-developed components is generally required. These extra steps add time and expense to the process. Furthermore, in prior art processes, adding protective layers to cover components may be required to make the surface of the wafer approximately flat so that other operations such as etching and lithography may be performed.

These limitations have restricted the development of devices that include both MEMs and ICs. Such devices may include, for example, a pressure sensor including a capacitor and supporting circuitry.

DETAILED DESCRIPTION

Figure 1:
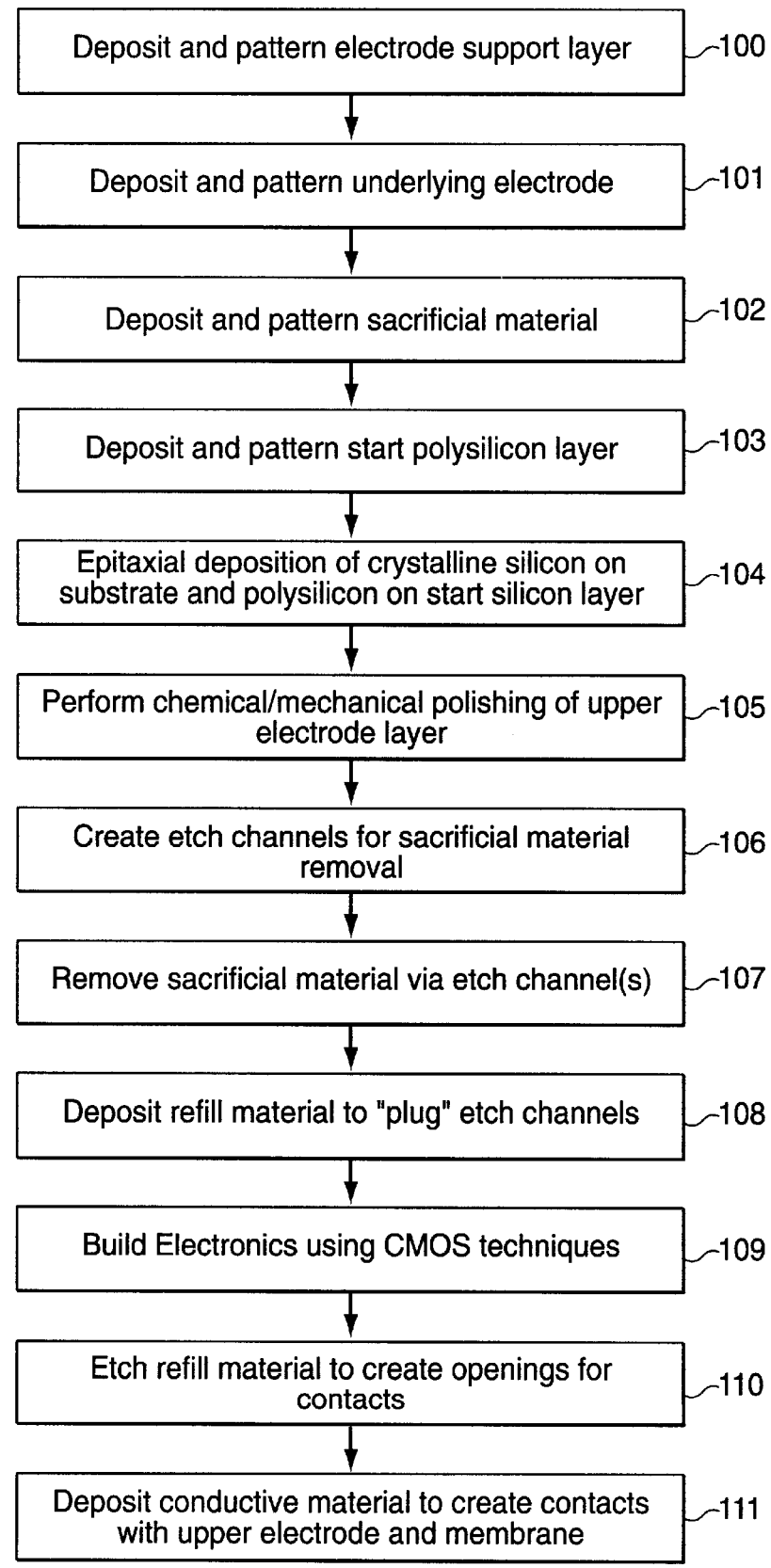
FIG. 1 shows a flow chart of a process for manufacturing an integrated pressure sensor system, according to an embodiment of the present invention.

According to an embodiment of the present invention, an integrated pressure sensor system will be described that includes a capacitor for measuring pressure together with integrated circuitry developed to operate with the capacitor. Referring to FIG. 1, a flow diagram is shown presenting the steps to be performed to fabricate an integrated pressure sensor according to an embodiment of the present invention. In step 100, a support layer such as silicon dioxide is deposited and patterned onto a substrate such as a silicon wafer. In step 101, the underlying (or first) electrode of the capacitor is formed through the deposition and patterning of a polysilicon layer on top of the previously patterned first oxide layer. As known in the art, other materials may be used for the underlying electrode such as a metal (e.g., aluminum or tungsten). In step 102, a sacrificial oxide (silicon dioxide) is deposited and patterned over the first oxide and the underlying electrode.

The patterning and etching may be performed according to any number of known techniques such as by coating the surface with a photoresist material, exposing portions of the photoresist to light, x-rays, or other such energy according to the pattern of a mask. Portions of the photoresist and the underlying layer may then be etched away using known techniques such as chemical or plasma etching. After the electrode support is created, an electrode may be created in step 101 by, for example, depositing a conductor on top of the support layer created in step 100. The electrode may be comprised of a semiconductor material, or a metal. In a preferred embodiment of the present invention, doped polysilicon is used as the electrode material. In another embodiment of the invention, the electrode is comprised of tungsten. Tungsten has both good conductivity and a high melting point and can therefore withstand high temperatures associated with CMOS processes. Likewise, doped polysilicon maintains its conductivity after high-temperature CMOS processes. The electrode material may be deposited and patterned using known processes such as vapor deposition or sputtering. After the electrode is created in step 101, a sacrificial material is added on top of the electrode in step 102. The sacrificial material may comprise, for example, silicon dioxide. The sacrificial material may be deposited and patterned according to known techniques, as described above.

Figure 2:
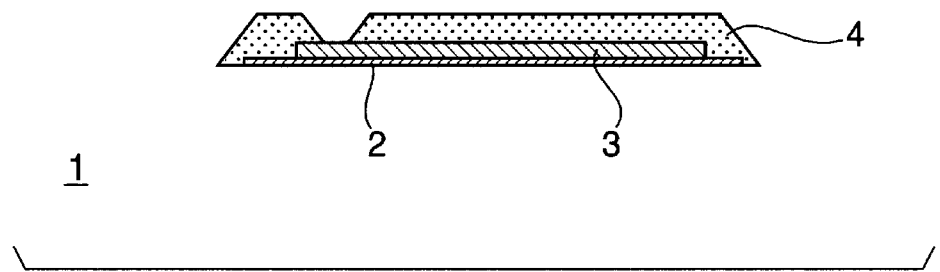
FIG. 2 shows a schematic diagram of an integrated pressure sensor after a series of first processing steps according to an embodiment of the present invention.

Referring to FIG. 2, a cross section of the structure after these first series of processing steps are performed is shown. The substrate I includes a first oxide layer 2 and an underlying electrode layer 3. On top of this is a sacrificial oxide 4. In this embodiment, an opening is made in the sacrificial oxide 4 for a subsequent conductive connection (e.g., polysilicon or metal) to the underling electrode 3.

Figure 3:
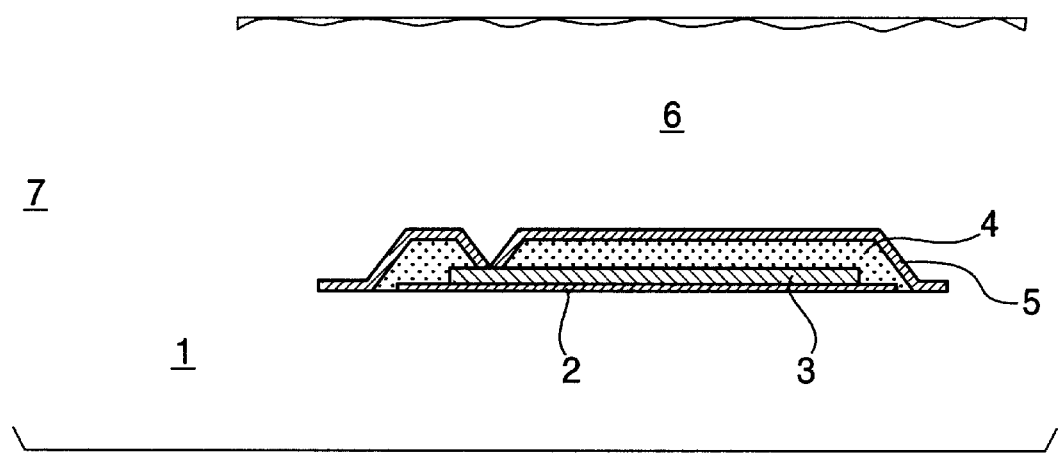
FIG. 3 shows a schematic diagram of an integrated pressure sensor following the epitaxial deposition of crystalline silicon and polysilicon.

Referring back to FIG. 1, in step 103, a start polysilicon layer is deposited and patterned on the sacrificial oxide layer. This polysilicon layer is needed for creating growing conditions for an epitaxial deposition of polysilicon. This start polysilicon may be grown or deposited and patterned according to known techniques, as described above. The start polysilicon layer may be deposited in order to create the proper conditions for growing a layer of epi poly over it. In step 104, an epitaxial deposition of single crystalline silicon and epitaxial polysilicon is performed on top of the substrate (e.g., using an epitaxial reactor). This process allows an in situ growth of poly and single crystalline silicon. Referring to FIG. 3, the start polysilicon layer 5 is shown deposited on the substrate 1, sacrificial oxide layer 4 and making contact with underlying electrode 3. The crystalline silicon layer is shown on top of substrate 1 and an epitaxial silicon layer 6 is grown from the start polysilicon layer 5.

Referring back to FIG. 1, in step 105 a chemical and/or chemical polishing is performed on the crystalline silicon and polysilicon layers. This polishing gets the surface of the system into a condition for supplemental CMOS processes as discussed further below. This chemical/mechanical polishing may be performed to prepare the surface of the epi poly/single crystal silicon layer for CMOS processes used to further develop the integrated capacitor device. This chemical/mechanical polishing may be performed according to known techniques. In step 106, the polysilicon layer is patterned then etched with Deep Reactive Ion Etch (DRIE) to create channels. A DRIE process may be performed, for example, by using a plasma to selectively etch a hole or trench through the upper electrode layer. This technique may also be used, for example, to create insulation gaps (e.g., for electrically defining and insulating components of the device). In this embodiment, these channels are used to remove the sacrificial layer in one step and to provide insulation between conducting elements. In step 107, the sacrificial layer is removed through etching. The sacrificial layer is removed by allowing a removal chemical or plasma such as hydrofluoric acid (HF) to flow through the etch channel to the sacrificial layer. The etch reactants are carried away in the resulting solution or as a gas. In step 108, the channels are at least partially refilled through an anisotropic deposition of refill oxide. The refill material may comprise, for example, silicon dioxide, which acts as an insulator. The insulation material may be deposited, for example, via anisotropic deposition, which deposits the oxide on a wafer surface and in the etch channels without allowing the oxide to flow into gaps where it is not wanted (e.g., the space left by the removal of the sacrificial material).

Figure 4:
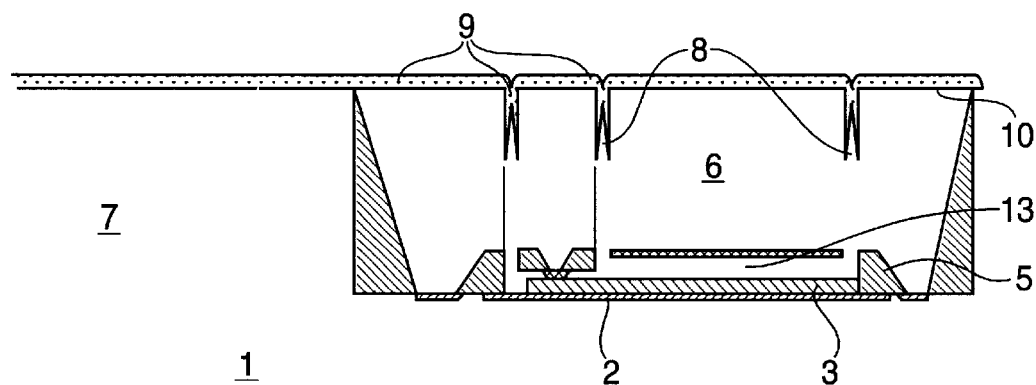
FIG. 4 shows a schematic diagram of an integrated pressure sensor system following the deposition of a refill material.

Referring to FIG. 4 a cross-section of the system after these steps is shown. Channels 8 are shown that were etched during the DRIE procedure extending to the sacrificial layer 4 (see FIG. 3). After the sacrificial layer is removed, a gap 13 remains between the start polysilicon layer 5 and the underlying electrode layer 3. The refill oxide 9 may cover the surface of the structure and at least partially fills the channels 8. The process parameters of the refill oxide deposition may be controlled so as to define the pressure in the channels 8 and gap 13.

Figure 5:
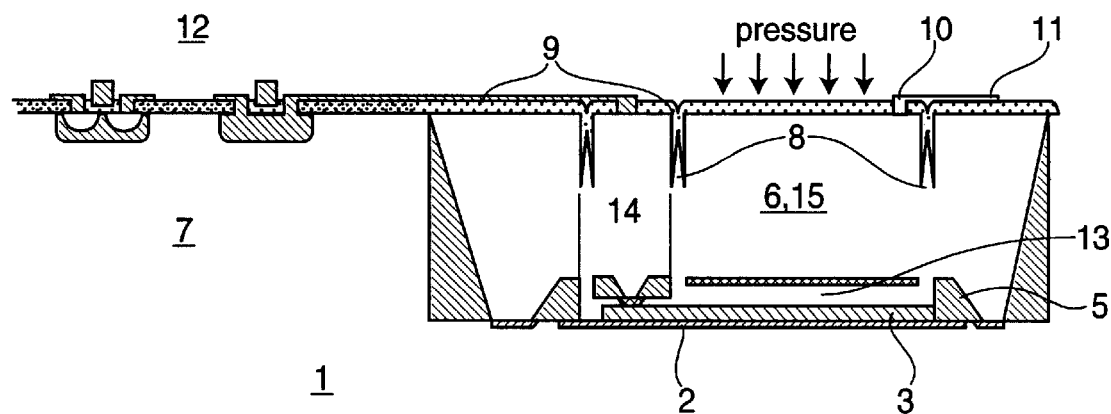
FIG. 5 shows a schematic diagram of an integrated pressure sensor system following the deposition of an electrical contact material and the creation of electronic components.

Referring back to FIG. 1, after the refill oxide layer has been deposited, the structure is then prepared for the addition of further circuit elements (such as those fabricated with CMOS techniques) on the crystalline silicon layer after the refill oxide is removed in that area (step 109). In step 110, areas of the refill oxide are removed to create openings for contacts. In step 111, conductive material (e.g., aluminum) is deposited to create electrical contacts between the further circuit elements and the electrodes of the capacitor that has been formed. Referring to FIG. 5, the final pressure sensor system is shown. In this example CMOS circuitry 12 is electrically coupled through polysilicon 14 and start polysilicon layer 5 to the underlying electrode 3. Circuitry 12 is also electrically coupled to the upper electrode of the capacitor (a portion of start polysilicon layer 5) through conductor 11, contact 10, and polysilicon (e.g, that functions as a membrane) 15. In operation, the volume contained in the sensor system is related to a reference pressure in the system. Pressure exerted above the upper electrode will result in a change in distance between the electrodes of the capacitor causing the existing capacitance to change. In this embodiment, the CMOS circuitry is capable of measuring the capacitance so as to output an indication of pressure applied above the upper electrode relative to the reference pressure mentioned above.

In the present invention, doped polysilicon is preferred for the electrodes of the capacitor system. In an alternative embodiment, electrodes made of tungsten (lower) and epi poly (upper level) may be used. By using any of these materials, resistance can be lowered to a desired level and the expense of the device can be lowered, since the device is less susceptible to heat, and therefore can withstand the CMOS processes (e.g., high heat). Furthermore, by providing a relatively flat top surface, rather than a stepped surface, CMOS processes can be employed because etching and lithography steps will not interfere with elements on different levels.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. An integrated pressure sensor system comprising:
   a substrate;
   an underlying electrode coupled to said substrate;
   an upper electrode including epitaxial polysilicon;
   a dielectric cavity between said underlying electrode and upper electrode;
   an etch channel coupled to the dielectric cavity; and
   a refill material, wherein the etch channel provides access to the dielectric cavity for removal of a sacrificial material before the etch channel is filled with the refill material.

2. The integrated pressure sensor system of claim 1, wherein a volume enclosed by said pressure sensor system exhibits a reference pressure for the system.

3. The integrated pressure sensor system of claim 1, further comprising:

an insulation gap to electrically insulate the upper electrode from surrounding material.

4. The integrated pressure sensor system of claim 3, wherein the etch channel includes the insulation gap.

5. The integrated pressure sensor system of claim 1, further comprising:
epitaxally-deposited single crystal silicon on which electronic components can be constructed using CMOS techniques.

6. The integrated pressure sensor system of claim 1, further comprising:
a contact layer for providing electrical contacts to the lower electrode and the upper electrode.

7. The integrated pressure sensor system of claim 6, wherein:
the electrical contact to the lower electrode is provided via the etch channel.

8. The integrated pressure sensor system of claim 6, wherein:
the electrical contact layer is comprised of aluminum.

9. The integrated pressure sensor system of claim 6, wherein the contact layer includes at least o me of polysilicon and metal.

10. The integrated pressure sensor system of claim 1, wherein:
the underlying electrical contact is comprised of tungsten.

11. The integrated pressure sensor system of claim 1, wherein:
the underlying electrical contact is comprised of polysilicon.

12. The integrated pressure sensor system of claim 1, wherein the epitaxial polysilicon of the upper electrode is grown on a starting polysilicon layer, the starting polysilicon layer being grown on the sacrificial material.

13. A pressure sensor system comprising:
an integrated capacitor including
a substrate;
an underlying electrode coupled to said substrate;
an upper electrode including epitaxial polysilicon;
a dielectric cavity between said underlying electrode and upper electrode;
an etch channel coupled to the dielectric cavity; and
a refill material, wherein the etch channel provides access to the dielectric cavity for removal of a sacrificial material before the etch channel is filled with the refill material; and
circuitry coupled to said underlying and upper electrodes to measure capacitance between said underlying and upper electrodes.

14. The pressure sensor system of claim 13, wherein a volume enclosed by said pressure sensor system exhibits a reference pressure for the system.

15. The pressure system of claim 14 wherein said circuitry determines an amount of pressure applied over said upper electrode based on said capacitance.

16. The pressure system of claim 15 wherein said circuitry is CMOS circuitry.

* * * * *

UNITED STATES PATENT AND TRADEMARK OFFICE
CERTIFICATE OF CORRECTION

PATENT NO.    : 6,521,965 B1                                          Page 1 of 1
DATED         : February 18, 2003
INVENTOR(S)   : Markus Lutz It is certified that error appears in the above-identified patent and that said Letters Patent is hereby corrected as shown below:

<u>Column 3,</u>
Line 11, change "SUBSTRATE I" to -- SUBSTRATE 1 --.

<u>Column 5,</u>
Line 23, change "at least o me" to -- at least one. --.

Signed and Sealed this

Eleventh Day of November, 2003

JAMES E. ROGAN
*Director of the United States Patent and Trademark Office*